United States Patent [19]  
Sauvajol et al.

[11] Patent Number: 4,935,866  
[45] Date of Patent: Jun. 19, 1990

[54] MULTIPROCESSOR CONTROL SYSTEM

[75] Inventors: Renë Sauvajol, Villepreux; Jean-Pierre Bernoux, Fontenay le Fleury, both of France

[73] Assignee: Compagnie Industriel des Telecommunications Cit-Alcatel, Paris, France

[21] Appl. No.: 365,681

[22] Filed: Apr. 5, 1982

[30] Foreign Application Priority Data

Apr. 3, 1981 [FR] France ............... 81 06808

[51] Int. Cl.⁵ ............................. G06F 9/00
[52] U.S. Cl. .................. 364/200; 364/228.4; 364/229; 364/230.4; 364/239
[58] Field of Search .............. 364/200, 900; 370/85, 370/110.1

[56] References Cited

U.S. PATENT DOCUMENTS

| | | | |
|---|---|---|---|
| 3,623,013 | 11/1971 | Perkins et al. | 364/200 |
| 4,156,798 | 5/1979 | Doelz | 364/200 |
| 4,214,305 | 7/1980 | Tokita et al. | 364/200 |
| 4,225,919 | 9/1980 | Kyu et al. | 364/200 |
| 4,253,146 | 2/1981 | Bellamy et al. | 364/200 |
| 4,287,590 | 9/1981 | Boute et al. | 370/59 |
| 4,334,305 | 6/1982 | Girardi | 364/200 |
| 4,388,686 | 6/1983 | Haid | 364/200 |
| 4,396,983 | 8/1983 | Segarra et al. | 364/200 |
| 4,414,624 | 11/1983 | Summer, Jr. et al. | 364/200 |
| 4,491,944 | 1/1985 | Caizergues et al. | 370/110.1 |

Primary Examiner—Gareth D. Shaw  
Assistant Examiner—John G. Mills  
Attorney, Agent, or Firm—Sughrue, Mion, Zinn, Macpeak & Seas

[57] ABSTRACT

A system for distributed control of a plurality of processors (UC1-UCa, UCP1-UCPb, MQ1-MQc) forming a set of processors (e.g., in a telephone exchange). Each processor is provided with a respective link coupler coupling it to a semaphore type serial link for point-to-point communication between processors. The control system comprises a network and a network distributor (DR1, DR2). The network comprises at least one clock link (H) for synchronizing data transfers, together with the following individual links between the network distributor and each of the processors in the set: a send request link; a send authorization link; a link for sending data to the distributor; and a link for receiving data from the distributor. The distributor detects a processor request-to-send signal on any of the send request links, for handling access to the network as a function of the request-to-send signals, and for authorizing a selected processor to send data to the distributor, and a decoupling circuit for receiving data sent to the distributor and for relaying the received data to all of the links for receiving data from the distributor, whereby the selected one of the processors is enabled to broadcast data to all of the processors in the set.

7 Claims, 7 Drawing Sheets

MULTIPROCESSOR CONTROL SYSTEM

The invention relates to a multiprocessor control system for use in a complex system controlled by a plurality of microprocessors, and in particular for a distributed control exchange.

The invention is applicable to to the electronics, telecommunications and computing industries.

BACKGROUND OF THE INVENTION

In known multiprocessor type systems, the machines are generally connected to a common bus over which they communicate with each other and over which they share a certain number of common resources such as memories, consoles, and peripherals for storage on magnetic media.

In spite of the advantages of such a structure, a common bus is limited in capacity to a small number of processors and it is also limited in physical length, further it is highly vulnerable.

Preferred embodiments of the present invention provide a simple type of link, i.e. one which can readily be made highly reliable, capable of interconnecting several tens of processors communicating with each other using a semaphore procedure, e.g. the HDLC type procedure defined in CCITT standard FSO.

Preferred embodiments of the invention also make it possible for a high degree of interchangeability between the processors and between the interfaces, thereby simplifying implementation of software and making it relatively simple to reconfigure an exchange in the event of a breakdown.

SUMMARY OF THE INVENTION

The present invention provides a multiprocessor control system for distributed control of a plurality of processors forming a set of processors, each processor being provided with a respective link coupler coupling it to a semaphore type serial link for point-to-point communication between said processors, wherein the control system comprises a network and a network controller, the network comprising at least one clock link for synchronizing data transfers, together with the following individual links between the network controller and each of the processors in said set:

a send request link;
a send authorization link;
a link for sending data to the controller; and
a link for receiving data from the controller;
the network controller including means for detecting a processor request-to-send signal on any of the said send request links, for managing access to the network as a function of said request-to-send signals, and for authorizing a selected processor to send data to the controller, and a decoupling circuit for receiving data sent to the controller and for relaying said data to all of said links for receiving data from the controller, whereby the selected one of the processors is enabled to broadcast data to all of the processors in said set.

BRIEF DESCRIPTION OF THE DRAWINGS

An embodiment of the invention is described by way of example with reference to the accompanying drawings in which.

DETAILED DESCRIPTION OF THE INVENTION

The following description relates to the application of the invention to controlling a time division exchange by means of microprocessors distributed between control units and markers for controlling the exchange's switching network.

Figure 1:
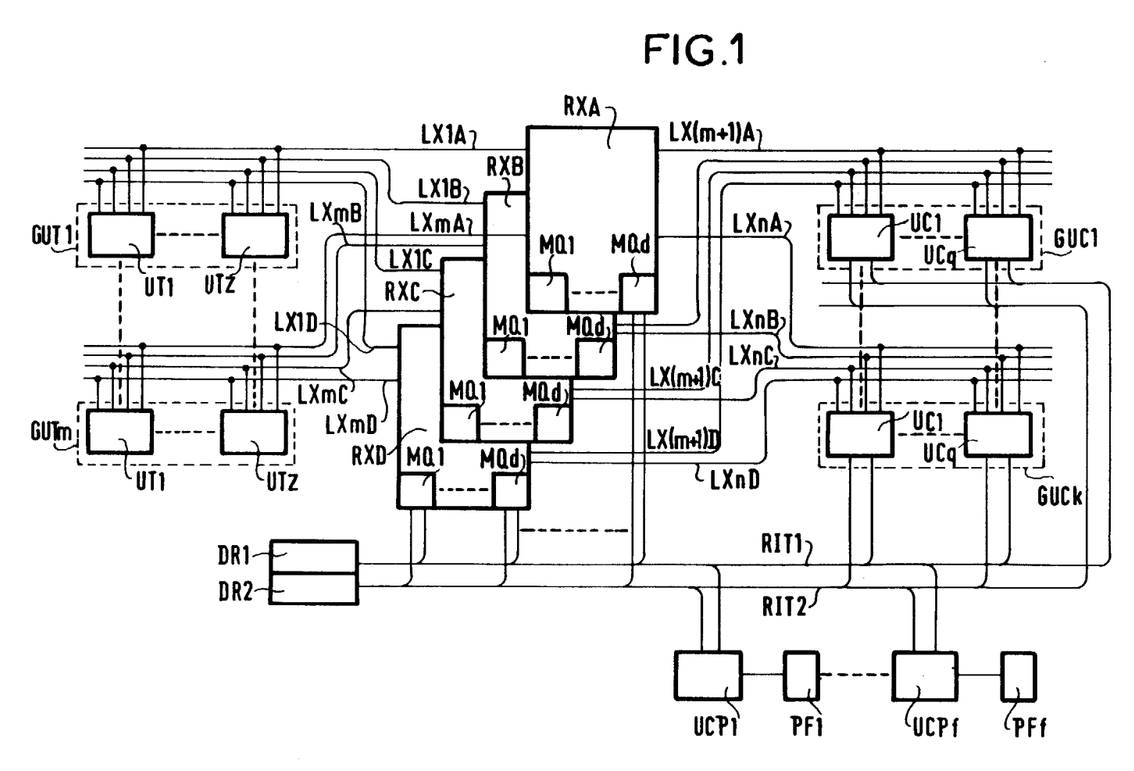
FIG. 1 is a block diagram of an exchange with a time division switching network.

The time division exchange shown in simplified manner in FIG. 1 comprises three main portions:

(1) m groups of terminal units GUT1 to GUTm comprising subscriber terminals, analog and digital circuits, and auxiliary signalling terminals for applying tones or recorded announcements to subscriber lines, for testing subscriber lines and circuits, together with conference circuits, etc. . . .

(2) A central switching network having a single stage of switching. The network is organized in independent planes, e.g. four planes RXA to RXD. The figures given in this description are merely by way of example and to simplify the drawings.

(3) Exchange control means of distributed architecture constituted by k groups of GUC1 to GUCk of identical control units UC, e.g. microprocessors. The control units per se UC1 to UCq are interchangeable. The control means also includes control units UCP1 to UCPf for controlling groups of peripherals PF1 to PFf. These control units may be identical to the preceding control units, but they cannot be totally interchangeable on account of their physical connections with the peripherals.

The above three portions of the exchange are interconnected as follows:

(1) The terminal units UT (UT1 to UTz) are connected to each of the planes RXA to RXD of the switching network via multiplex links LX such as LX1A to LXmD each of which comprises 32 time slots which are 8 bits wide and operating at 2 M bits/sec in each transmission direction. The terminals units UT of each group are connected in parallel to the same multiplex links LX.

(2) The control units UC1 to UCq are likewise connected to the switching network via multiplex links LX(m+1)A to LXnD, with one multiplex link LX per group GUC to each plane of the network. Messages interchanged between control units and terminal units are transmitted via time slots in the links LS which are connected by the switching network in a semi-permanent and reconfigurable manner. Data transmission channels are thus provided having a data rate of 64 K bits/sec which are used according to the so-called HDLC procedure defined in the CCITT's standard ISO.

(3) The control units UC and UCP are interconnected by point-to-point links RIT1 and RIT2 which are doubled up for safety reasons. They are serial links which likewise use the HDLC procedure. Access to these links is managed by a duplicated controller DR1, DR2 which authorizes transmission thereover and which supervises the durations of such transmissions. The link comprises five pairs of wires going to each station connected thereto, for the purposes of calling, authorization, clock transmission, signal transmission and signal reception.

Connections between the control units UC and the terminal units UT are established via the switching network by means of semi-permanent connections between PCM time slots.

Figure 2:
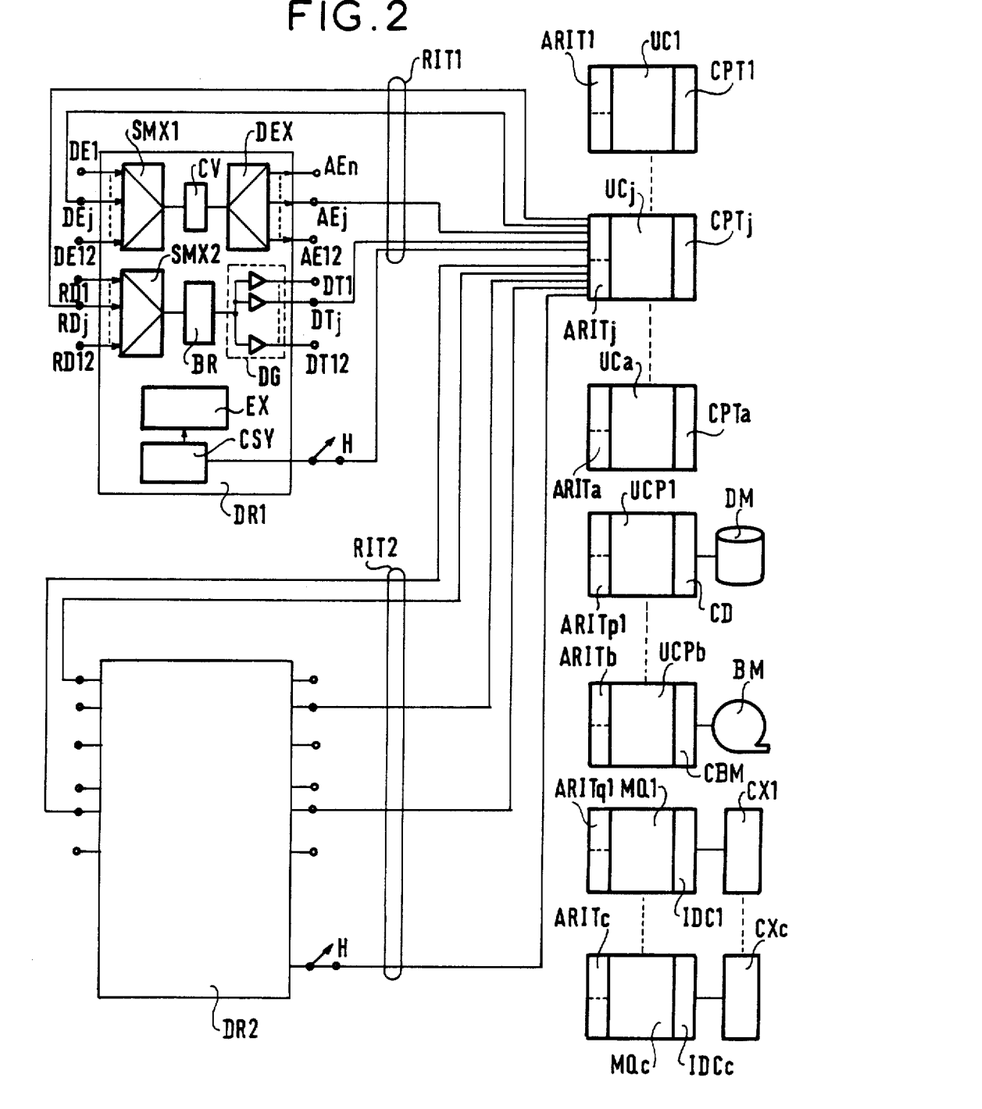
FIG. 2 is a general diagram of a data interchange network in accordance with the invention for interchanging data between control units and markers in a switching network of the time division exchange.

FIG. 2 shows the structure of the duplicated data interchange network RIT1, RIT2, and its duplicated controllers DR1, DR2.

Exchange control is distributed between a plurality of microprocessors all of which are connected to the interchange network RIT1, RIT2 via respective couplers ARIT, specifically referenced ARIT1, ARITj, ARITa, etc. Control units UC1 to UCa are connected to telephone equipment, via appropriate couplers CPT1 to CPTa. Control units UCP1 to UCPb are connected via peripheral couplers CD to disks DM, and via couplers CBM to magnetic tape BM. Markers MQ1 and MOc for controlling the switching network are each connected to a corresponding switch CX1 to CXc via a coupling interface UDCl to IDCc.

Since the data interchange network is duplicated, the interfaces ARIT provide access to two links RIT1 and RIT2 of the network RIT each of which is controlled by a respective controller DR1, DR2. Each controller controls r unit links, where r=a+b+c, each unit link comprising request lines DE1 to DE12, seizure authorization lines AE1 to AE12, reception authorization lines RD1 to RD12, transmission authorization lines DT1 to DT12, and a clock H.

The controller DR1 comprises three selectors SMX1, SMX2 and DEX driven by a scanner EX, a transmission interface DG for sending data in parallel to all the processors, and a synchronizing circuit CSY. Requests DE are enabled by a circuit CV. Data RD1 is relayed via a bistable BR.

Figure 3:
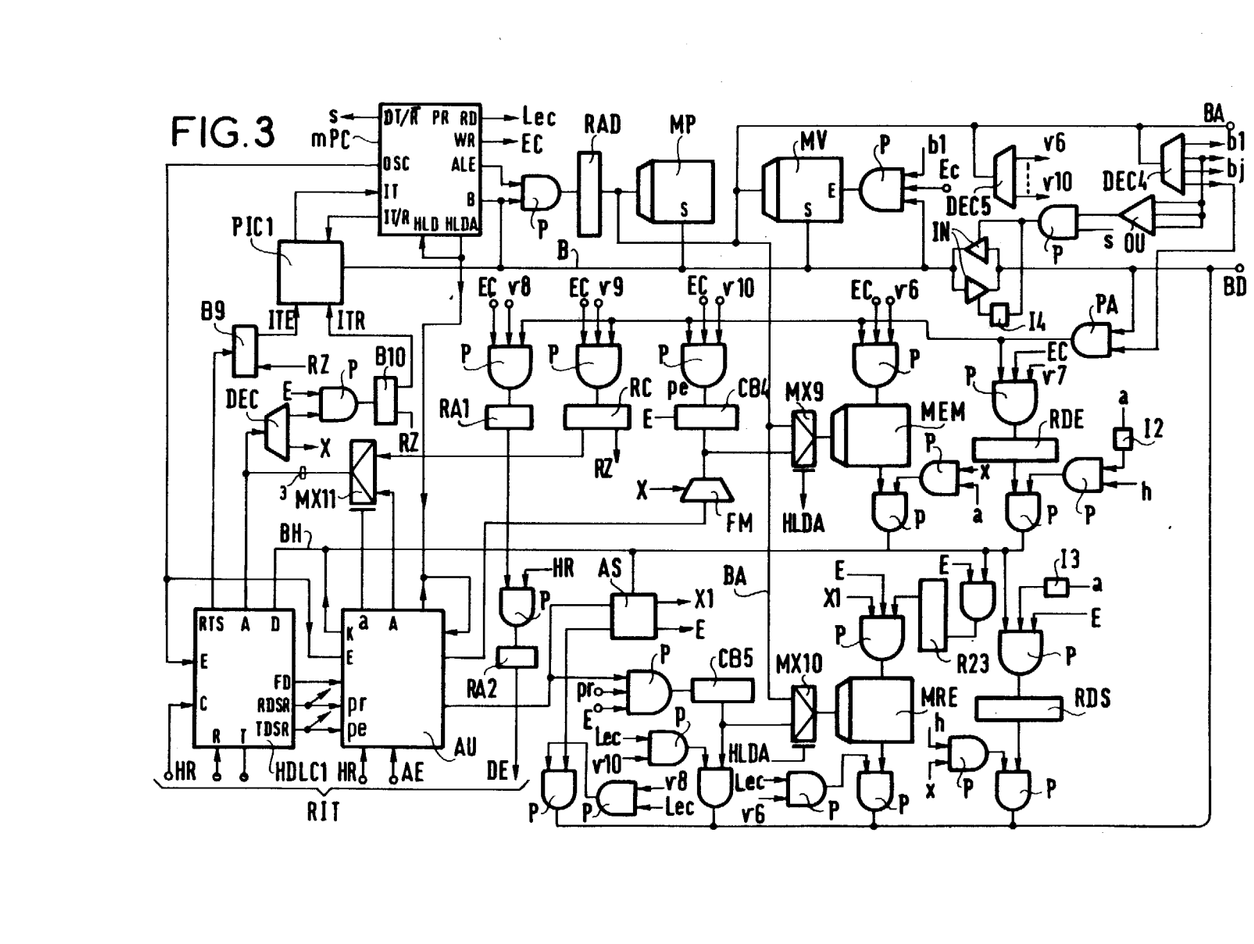
FIG. 3 is a circuit diagram of a marker and its access to the data interchange network.

A marker MQ1 and its access to the network RIT are shown diagramatically in FIG. 3.

The marker MQ1 includes a microprocessor mPC, e.g. an INTEL 8086 circuit associated with an INTEL 8284 clock circuit. An internal bus B feeds the address bus BA via an address register RAD, and a data bus BD via a directional interface IN under the control of the microprocessor mPC. The interface IN direction is controlled by a combination of an output signal s from the DT/R output of the microprocessor combined with the input/output addressed received by an OR gate and a decoder DEC4.

The microprocessor MPC is associated with a program memory MP, e.g. a REPROM and a read/write data memory MV.

The unit providing access to the RIT links comprises a circuit HDLC1 for controlling data interchange using the HDLC procedure, an interface driver AU and intermediate buffer memory memories for sending MEM and for receiving MRE.

The HDLC1 circuit may, for example, be a MOTOROLA type 6854 circuit.

The driver AU is made in known manner from a logic circuit comprising a read only memory associated with an input register to receive input information, and an output register to receive data from the memory. Both registers are clocked by clock signals supplied to an input E via the OSC output from the microprocessor, which signals also drive the circuit HDLC1. The inlet to the access unit is connected to the bus BD under the control of an access gate PA itself controlled by an address bj coming from the decoder DEC4.

The accesses to the microprocessor mPC comprise the following circuits and commands:

(1) Control signals WR and RD (wires EC and Lec) from the microprocessor are used together with a select signal (v6 to v10) obtained by the decoder DEC5 acting on the address.

(2) Multiplexed addressing of the memories MEM and MRE, firstly by the microprocessor via the bus BA and secondly by the interface driver AU via the counters CB4 and CB5 and the multiplexers MX9 and MX10 in a manner described below.

(3) Use of the following additional circuits:
 (a) An inlet data register RDE connected between the gate PA and the bus BH of the circuit HDLC1.
 (b) An outlet data register RDS between the buses BH and BD.
 (c) An inlet buffer register R23 for the memory MRE.
 (d) A control register RC containing instructions for resetting the internal registers of the circuit HDLC1 to zero (inlet A corresponding to the instructions R/W, RS0, RS1 of the 6854 circuit) supplied via a multiplexer MX11 driven by the output from the interface driver AU, whereby the circuit HDLC1 can be driven either by the microprocessor or by the interface driver.
 (e) Calling registers RA1 and RA2 to provide access to the link RIT, the microprocessor loads the register RA1 and clock signals HR from the link RIT to transfer the information into the register RA2 and apply a mark to a wire DE, authorization to send in reply AE is received by the driver AU.
 (f) A circuit for recognizing the control unit address AS, this address is used to identify the control units connected to the RIT links, and is hard wired in each circuit to be compared on receiving a signal with the internal address in the messages, and on sending a signal it is inserted into the messages.
 (g) A programmable circuit PIC for handling microprocessor interrupts in order to cope with requests for service from the interface driver both when sending and when receiving. An INTEL 8259 circuit could be used, for example. For transmission, the output RTS of the circuit HDLC1 provides an interrupt signal ITE directly via a bistable B9. For reception, an interrupt signal ITR is provided by the driver AU which actuates a bistable B10. These bistables are reset to zero by a signal RZ supplied by the register RC.

These circuits operate as follows:

When the microprocessor mPC requests to send:

(1) The memory MEM is loaded by the microprocessor mPC, the memory may contain a complete n byte message with the address of the last byte being loaded into the counter CB4.

(2) The memory is read by the circuit HDLC1 under the control of the interface driver.

(3) The counter CB4 is caused to count down under the control of a ready to send signal pe supplied by the circuit HDLC1 indicating that its send register is empty.

(4) Access from the output of the memory to the bus BH is enabled by the interface driver whose outputs a and A supply a code X for controlling writing in the send register of the circuit HDLC1.

(5) When the counter has counted down to 0, an end of message decoder FM informs the driver, and the driver causes the circuit HDLC1 to send appropriate end of message codes.

To receive messages over the link RIT, detection of the beginning of a message is marked on an output FD of the circuit HDLC1, thereby informing the driver AU. The driver causes the receive register of the circuit HDLC1 to be read and the circuit AS recognizes the address of the marker. For each byte received, the circuit HDLC1 activates its output RDSR to supply a ready to signal receive pr. The signal pr enables the clock input to the counter CB5. The interface driver causes the receive register of the circuit HDLC1 to be read and the data to be written into the memory MRE by means of a signal X1. The driver then calls the microprocessor mPC. Several messages may be queued up in the memory MRE.

The microprocessor reads the counter CB5 and each of the messages contained in the memory.

Each message gives rise to an acknowledgement message in return.

The marker MQ1 performs instructions provided by the control unit UC to which it is attributed. Some of the instructions give rise to a report message reporting on the setting up, clearing down or checking of a connection established via the switch CX1.

Figure 4:
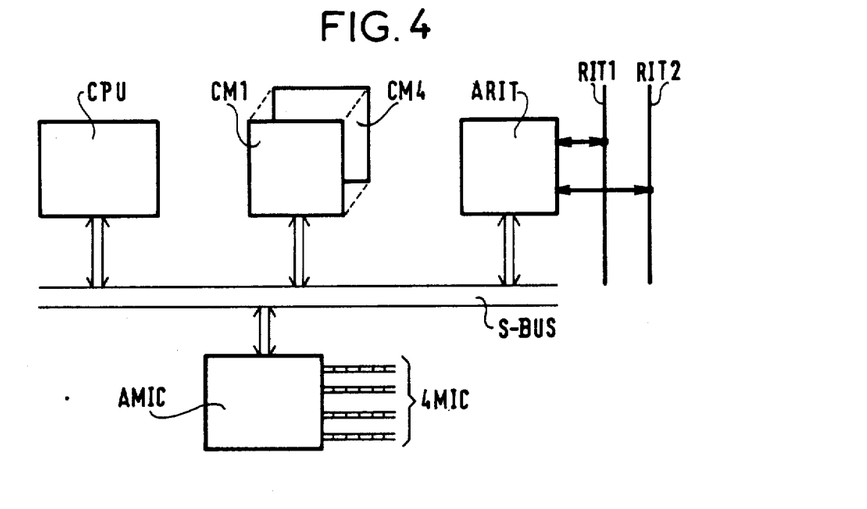
FIG. 4 is a diagram of a control unit.

A control unit UC1 is shown diagramatically in FIG. 4.

A control unit UC comprises the following members connected to a system bus S-BUS:
 (a) A processor card CPU;
 (b) Memory cards such as CM1 to CM4;
 (c) An interface card ARIT for interfacing with the links RIT1, RIT2; and
 (d) An interface card AMIC for interfacing with PCM links labelled MIC which serve telephone terminal units, for example.

The CPU and ARIT cards together with the S-BUS bus are described below, as is the controller DR1 which controls access to the link RIT1.

Figure 5:
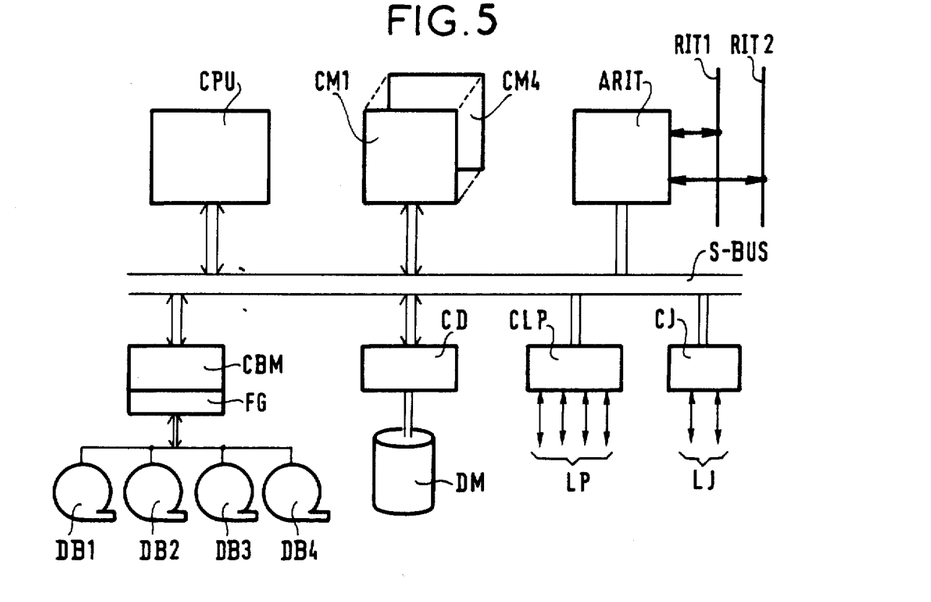
FIG. 5 is a diagram of a control unit controlling computing peripherals.

A peripheral control unit UCP is shown diagramatically in FIG. 5 and is of similar architecture to one of the control units UC. It comprises peripheral couplers such as:
 (a) A magnetic tape coupler CBM associated with a formatting logic circuit FG which controls four tape drives DB1 to DB4;
 (b) A coupler CD for a disk DM;
 (c) A programmable coupler for digital links CLP for controlling, for example, four links LP which are separately usable in synchronous or in asynchronous mode; and
 (d) A coupler CJ for links LJ of the LX25 type as defined by the CCITT.

Figure 6:
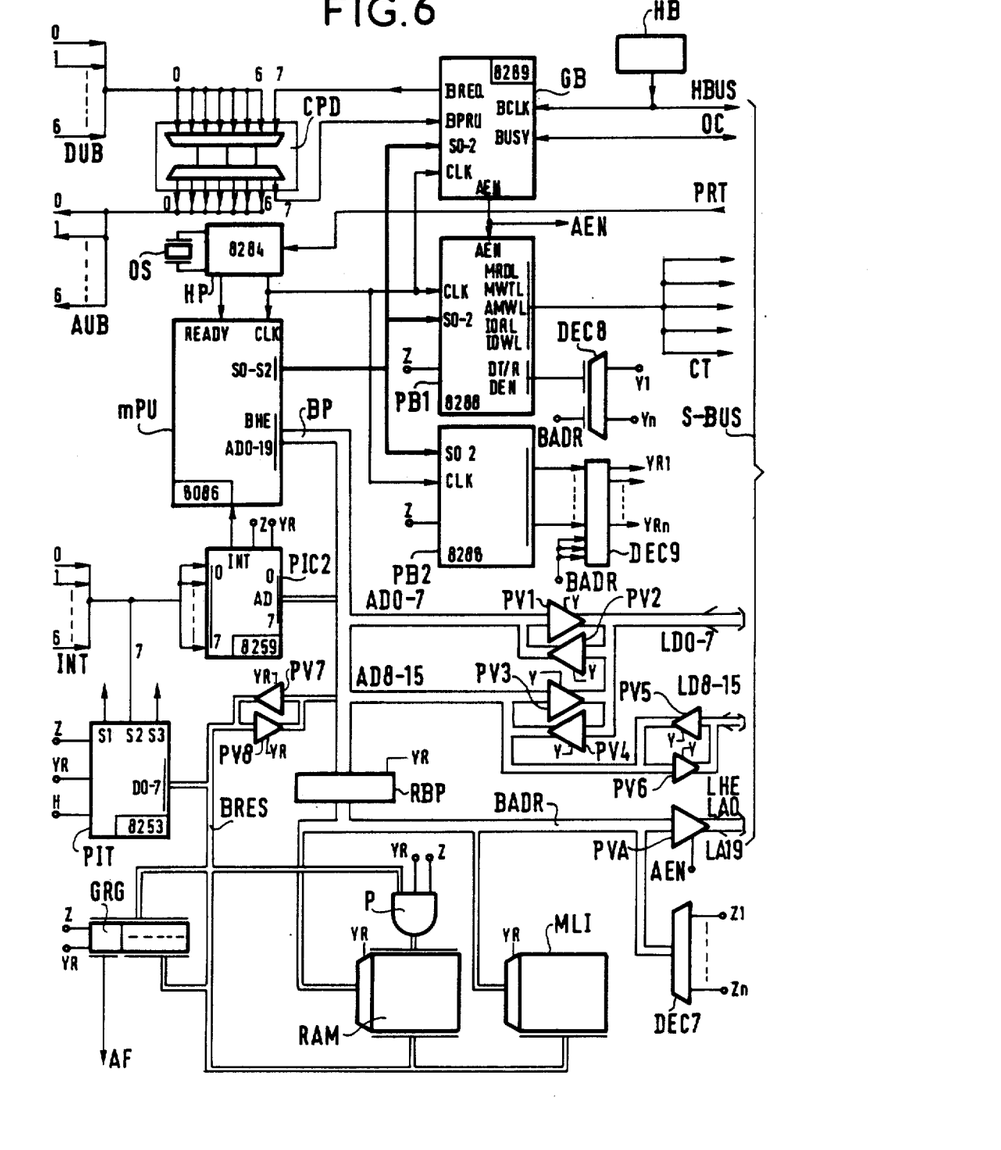
FIG. 6 is a circuit diagram of a processor.

The processor card CPU and the system bus S-BUS are shown in greater detail in FIG. 6.

A microprocessor mPU has access to the system bus S-BUS and to a resident bus BRES for controlling the resources on the CPU card itself: namely a read only memory MLI containing initialising programs, read/write memory RAM, registers, and timing means.

In this application, the microprocessor mPU (FIG. 6) is constituted by an INTEL circuit type 8086. Other INTEL circuits in the same family are also used and are introduced in turn in the following description, naturally other circuits could have been used, but it is convenient to remain within a single family. For a detailed description of the state of the art reference can be made to the INTEL manual entitled "The 8086 Family User's Manual, October 1979", and in particular to the chapter concerning the "Multibus" bus system.

The interfaces to the processor bus BP (outputs AD0 to AD19 of the 8086 circuit) are as follows:
 (a) A bus register RBP gives access to an address bus BADR. This bus is connected to the addressing inputs of the read only memory MLI and the read/write memory RAM, to a decoder DEC7 which provides Z addresses, eg. Z1 to Zn for enabling various circuits on the card, and to a group of enabling gates PVA having three state outputs for supplying addresses to the address lines LA0 to LA19 of the bus S-BUS.
 (b) Pairs of three state gates PV1 to PV6 providing two-way access to the data lines LD0 to LD15 of the bus S-BUS, where:
  PV1 and PV2 provide access between AD0-7 and LD0-7;
  PV3 and PV4 provide access between AD8-15 and LD0-7;
  PV5 and PV6 provide access between AD8-15 and LD8-15;

An indication of the byte sent or received over the lines LD0-7 (i.e. more or less significant byte) is provided by an output BHE from the processor which is connected to the register RBP and to a line LHE of the S-BUS.
 (c) Access to the 16-wire resident data bus (BRES) is provided by a pair of three state gates PV7 and PV8.

The resident bus BRES provides access to the following circuits:
 (a) RAM memory (read and write) and ROM memory MLI (read only).
 (b) A group of registers GRG (input registers and some input/output registers, in particular via a wire AF leading to a display device (not shown).
 (c) A triple programmable counter PIT, e.g. an 8253 type circuit which is used as follows:
  Output S1 monitors the duration of S-BUS usage, and releases the bus if it has been used for too long.
  Output S2 provides interrupts for time marking.
  Output S3 is a count output used for measuring time.

Interrupts are handled by a programmable circuit PIC2, e.g. an 8259 type circuit, which receives interrupts INT from the counter PIT and from couplers on lines INT0 to INT6. The circuit PIC2 and analogous circuits situated in the couplers operate in master/slave mode, with circuit PIC2 being the master. This circuit is directly connected to the wires AD0 to AD7 of the bus BP.

Control of the buses and circuits on the processor card CPU is as follows:
 (a) Outputs S0 to S3 of the control links to the microprocessor mPU are connected to bus controller circuits PB1 and PB2 (8288 type circuits) and to a circuit GB for controlling access to the S-BUS (an 8289 type circuit). The clock for the circuits mPU, PB1, PB2, and GB is provided by an oscillator OS and a clock circuit HP (an 8284 type circuit). This circuit receives "ready to transmit" signals PRT from the couplers connected to the S-BUS and synchronizes them with the clock to apply a "READY" signal to the microprocessor circuit MPU. An enable output "AEN" from the circuit GB is connected to the circuit PB1 and to the gates PVA.

(b) The circuit PB1, an 8288 type circuit in this case, provides:

Read and write control signals in memory access mode or read/write control signals for the S-BUS via wires CT;

Control signals Y1 to Yn for the pairs of gates PV1 to PV6 giving access to the S-BUS: the Y control signals are applied at the output of a decoder DEC8 which receives the DT/R and DEN outputs from the circuit PB1 together with the least significant bit wire from the bus BADR.

(c) The circuit PB2, likewise an 8288 type circuit, provides internal enabling signals YR, such as YR1 to YRn to the circuits PIT, PIC2, PV7, PV8, RBP, RAM, MLI and GRG via a decoder DEC9.

The S-BUS is shared between microprocessor MPU and the couplers, as is explained in greater detail below, e.g. via direct memory access (DMA mode). The S-BUS control signals are as follows:

(a) Bus requests DUB and bus authorizations AUB: the point-to-point links to the couplers are handled by a priority coding and decoding circuit CPD on the card CPU. The circuit CPD receives the processor leads BREQ and BPRU from the circuit GB on its highest priority input/output circuit (No. 7).

(b) The S-BUS clock "H-BUS" is supplied by a clock HB which also feeds an input BCLK to the circuit GB.

(c) A wire OC indicating the busy status of the bus is connected to the "busy" terminal of the circuit GB.

In this application, known art has been used and then adapted to improve speed and simplicity in handling data interchanges between the processors, in particular by handling the couplers in memory space and in using point-to-point mode for processing information concerning interrupts and concerning the setting up of a data interchange:

(a) The couplers AMIC to the PCM links MIC have interchange memories which are accessible to the microprocessor mPU.

(b) The couplers ARIT to the links RIT1 and RIT2 have access to the system memories in DMA mode.

Figure 7:
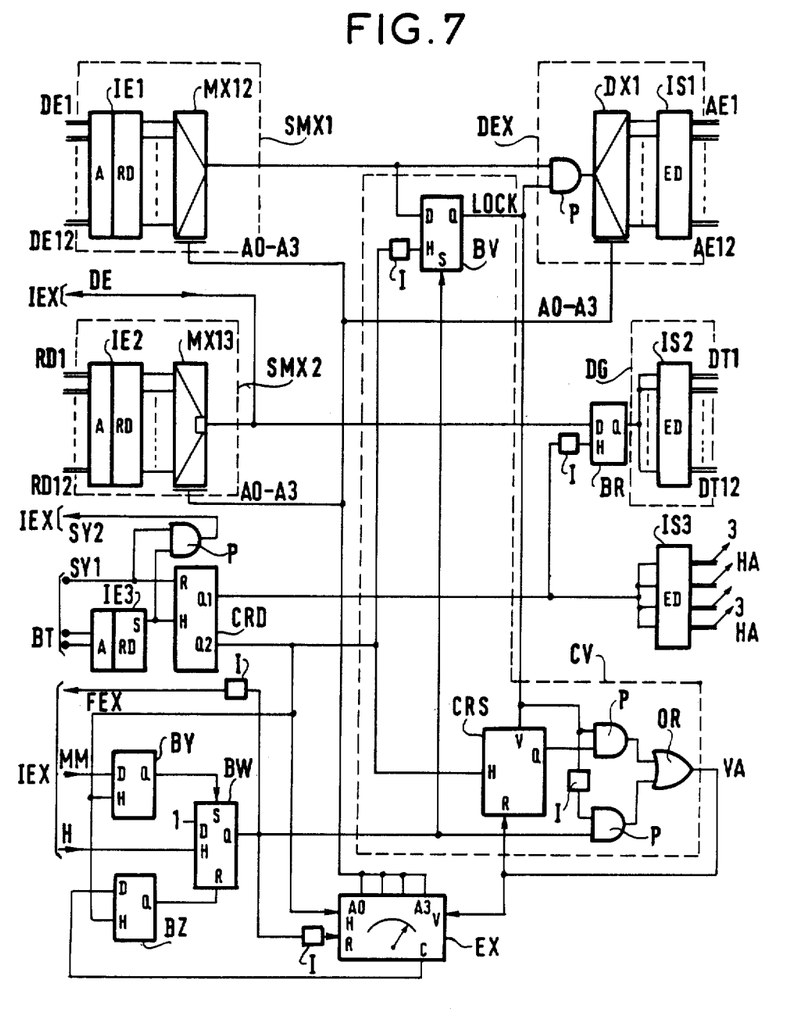
FIG. 7 is a circuit diagram of a data interchange network controller.

One of the point-to-point link controllers DR1 or DR2 is shown diagramatically in FIG. 7.

In this application of the invention, modular controllers are used as described below.

A controller module serves to connect twelve control units UC or UCP, or markers MQ. Each unit or marker is connected to each link RIT1 and RIT2 of the RIT network via five pairs of wires having the following functions:

(a) DE: request access to the duplicated network RIT1, RIT2.
(b) AE: access authorization.
(c) RD: data to be transmitted (from station n to the links RIT1, RIT2 of the network RIT).
(d) DT: data to be transmitted (from the network RIT1, RIT2 towards a destination station).
(e) H: synchronizing clock.

The controller module comprises inlet interfaces IE1 to IE3 comprising a matching circuit A and a differential receiver RD, outlet interfaces IS1 to IS3 comprising differential senders ED, and multiwire extension links IEX for interconnecting the modules to each other.

The inlet interface IE1 is connected to twelve pairs of access request links DE1 to DE12, the inlet interface IE2 is connected to twelve pairs of data transmission links RD1 to RD12, and the inlet interface IE3 is connected to receive signals from a 4 MHz clock provided by a time base BT for the equipment as a whole. The access request links DEn and the data transmission links RDn go to twelve respective control units or markers.

The outlet interfaces IS1 are connected to access authorization links AE1 to AE12 and the outlet interfaces IS2 are connected to data transmission links DT1 to DT12. The outlet interface IS3 distributes a clock signal HA over four pairs of wires which each serve three stations (i.e. control units or markers) in parallel. The links DE1 to DE12, AE1 to AE12 and RD1 to RD12 are sequentially enabled by a scanning counter EX which addresses respective multiplexers MX12 and MX13 and the demultiplexer DX1 (addresses A0 to A3).

Data signals DT and clock signals HA are sent simultaneously to all the stations UC, UCP and MQ. The clock signals HA are at a frequency of 1 MHz obtained by dividing the signals from the basic clock BT via a counter CRD. The basic block also transmits a frame synchronization signal SY1 which is applied to the reset to zero input of the counter CRD. The frame sync signal SY1 of the first module is sent via a gate P and a wire SY2 in the link IEX to an SY1 input to the other modules in series.

Link seizure by one of the stations UC, UCP or MQ is stored in an enabling bistable BV which provides a LOCK signal to stop the scanner EX via the counter CRS and to provide access to the demultiplexer DX1 which gives an authorization signal AE.

Data received over the wires RD are regenerated by a bistable BR. The data received by one module may be forwarded to a unit connected to any of the modules. The multiplexer MX13 has a three state output multipled via the wire DE of the link IEX with the equivalent multiplexers of the other modules.

The duration for which any of the stations is allowed to seize a link in the network is limited to 10 ms by the monitoring counter CRS which generates a signal VA via a hard wired logic circuit comprising gates P, I and OR, to authorize the scanner to continue scanning if the time limit expires.

The Q2 output from the counter CRD supplies clock signals to the circuits ES and CRS, and inverted clock signals to the circuit BV. The send clock signals provided by the Q1 output of the counter CRD pass via a phase inverter I to the regenerator bistable BR at a frequency of 1 MHz.

The duplicated controller DR1, DR2 operate as follows:

(a) Starting up: the first module of the controller receives a signal MM on a bistable BY driven by the Q2 output of the counter CRD. The Q output of the bistable BY sets an authorization bistable BW and thereby frees the scanner EX.

(b) Taking a send request DE1 into account: when the scanner EX addresses the corresponding inlet to the interface IE1, the bistable BV delivers a LOCK signal having the following three actions:

A gate P providing access to the demultiplexer DX1 is opened and an authorization signal AE1 is sent;

The surveillance counter CRS is authorized to progress; and

The scanner EX is stopped (by closing a gate P).

(c) End of sending: the signal DE1 is removed before 10 ms is up, thereby resetting to zero the signals AE1 and LOCK and resetting to zero the counter CRS, and releasing the scanner EX.

(d) Time out before end of sending: the output from the counter CRS opens the gate P thereby releasing the scanner EX.

(e) End of scanning: the end of count output C from the scanner EX is connected to the P input of a bistable BZ which controls the resetting to 0 of the bistable BA. This then controls, via a wire FEX in the link IEX the clock input H to the bistable BA of the following module. When all the modules have performed a scan, the cycle starts again.

Figure 8:
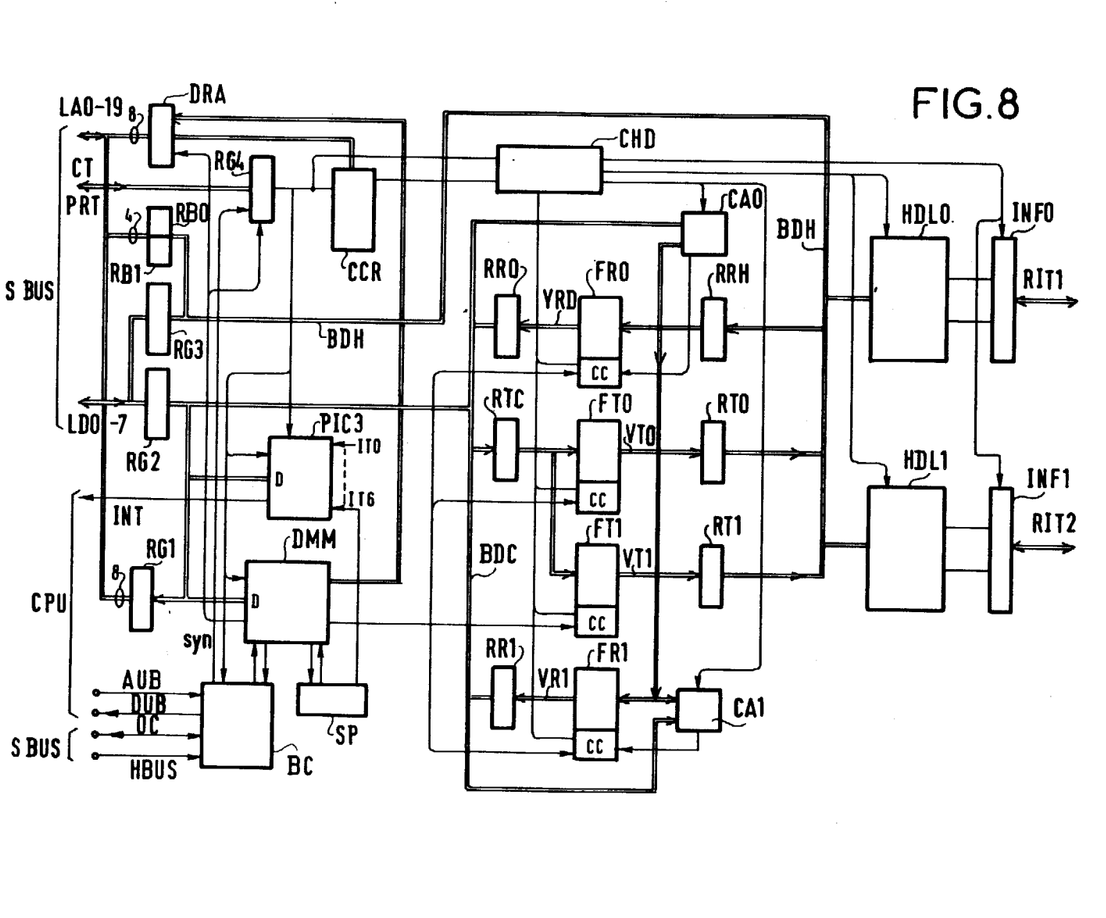
FIG. 8 is a circuit diagram of a coupler for coupling to the data interchange network.

FIG. 8 is a circuit diagram of a coupler for providing connections to the data interchange network. It controls a dialogue or data interchange between processors. It occupies one printed circuit card in the processor rack. It is connected both to the S-BUS of the processor to interchange messages by the direct memory access procedure (DMA), and also to the links RIT1 and RIT2 of the data interchange network RIT for interchanging data using the HDLC procedure of the same type as that which has been described above for markers.

The coupler provides simultaneous access to both links RIT1 and RIT2 of the network RIT and simultaneous transfer operations via a direct memory access circuit DMM, and includes circuits HDL0 and HDL1 for supervising data interchanges as described below.

To do this the coupler comprises four internal paths and each path is associated with a FIFO (first in first out) type storage register having a capacity of 64 bytes. In particular, a register FR0 in a reception path VR0 is associated with the link RIT1. A register FR1 in the reception path VR1 is associated with the link RIT2. A register FT0 in a transmission path VT0 is associated with the link RIT1. And a register FT1 in a transmission path VT1 is associated with the link RIT2.

These paths have access via a bus BDH to the processing data interchange circuits, to an internal bus BDC, and to the circuits HDL0 and HDL1.

Data transfers between each register FR or FT and the bus BDC or BDH are synchronized by means of buffer send registers RTC, RT0, RT1 and receive registers RRH, RR0 and RR1.

A generalized interchange procedure is used both when sending and when receiving.

When sending, the processor enables the circuits DMM and HDL0 and supplies a signal DE0 requesting seizure of a link such as the link RIT1 in the network RIT. After an acknowledgement signal AE0 from the link RIT1, the direct memory access circuit DMM begins to transfer data from the processor memory to the register FT0 in the path VT0 in packets of sixteen bytes, until the register is full. The circuit HDL0 begins to transmit as soon as the first byte is available, and continues until the circuit DMM signals the end of the message and the register is emptied. Circuit HDL0 terminates the message. The link RIT1 is released and an interrupt is sent to the processor requesting it to read the state register of the circuit HDL0.

The various interrupts are handled on the coupler card by a programmable circuit PIC3, for example an INTEL type 8259A circuit. This circuit is driven by the 8259A circuit of the processor in master/slave mode. Data interchange is either by an interrupt INT and acknowledgement signal INTA, or else by the slave circuits being scanned by the master circuit.

When receiving, the processor enables the DMM circuit and the receiver of the circuit DDL0. After detecting a flag, the following byte is compared with the coupler address. If there is a match, sixteen bytes are loaded into the register on the path VR0 and a service request is sent to the circuit DMM. A new request is sent for each packet of sixteen bytes, until an end of message flag which occurs when the register FR0 is empty. The receiver is disabled and an interrupt is sent to the microprocessor requesting it to read the state register of the circuit HDL0, and also of the direct memory access circuit DMM which indicates the length of the message and its address in memory.

The processor supervises direct memory access for transferring the packets of sixteen bytes, but the direct memory access circuit DMM controls the transfer of each packet directly, taking control of the S-BUS for the duration of the transfer.

The coupler is considered by the processor as part of its memory address space, and the only instructions the processor needs to use, apart from those required for handling direct memory access are read instructions Lec and write instructions EC together with the response of the addressed device, i.e. a ready signal sent over the wire PRT of the S-BUS as defined above.

The coupler circuits mentioned above are interfaced with the S-BUS, and in particular they have access to the address lines LA0 to LA19, the data lines LD0 to LD7, and the transfer control lines CT and PRT for controlling the S-BUS. The eight least significant address lines (LA0 to LA7) are connected to a two-way driver access circuit DRA. During transfer to the microprocessor memory in direct access mode these lines receive data from the direct memory access circuit DMM. The address lines LAS to LA15 receive data in direct access mode from the circuit DMM via an output register RG1. During input these lines are connected to the destination circuits. The remaining address lines LA16 to LA19 receive data via two block address registers RB0 and RB1 each of which is associated with one of the links in the network RIT. The registers are loaded from the processor via the data bus and indicate the 64 K-byte block of memory in which the message received should be stored. When sending, the direct memory access circuit DMM reads the message in the block whose base address is equal to zero.

Internal use of the bus lines by the coupler is described below. Only the eight data lines (LD0 to LD7) are used. They are connected via two-way registers RG2 and RG3 to the internal buses BDL and BDH. The direction of data transfer is controlled by the direct memory access circuit DMM.

A register RG4 serves to relay the transfer control lines CT and PRT and during input the read/write control signals, thereby enabling these control signals to be synchronized with a signal "syn" provided by a bus control circuit BC.

When sending, the signals are supplied by the direct memory access circuit DMM. The signal PRT is also sent by the bus control circuit PC on the basis of the signal "syn". The lines providing control of the S-BUS by the bus controller circuit BC comprise the wires for seizing and releasing the bus, namely the bus clock synchronization line HBUS, the line DUB by which the direct memory access circuit DMM requests use of the bus, and the line AUB by which the processor authorizes use of the bus.

The bus controller circuit BC serves merely to relay these signals and to synchronize them with the bus clock.

The coupler circuits also include a control circuit CCR. This circuit decodes data on the address lines LA and on the line CT in order to provide control signals to the circuits in the coupler.

To control the coupler, the processor uses 64 memory words in a 16 Kbyte block identified by hard wiring on the connector in which the coupler card is inserted. The 64 words are addressed by the six least significant bits of the address lines LA. The four bits LA0 to LA3 define the instruction and the bits LA4 and LA5 define the circuit addressed by that instruction.

The direct memory access circuit DMM is an INTEL type 8257 programmable circuit. This circuit is capable of controlling four different paths, and it is used to transfer packets of 1 to 16 bytes.

It is associated with a buffer register RTC for sending to the registers FT0 and FT1 on the paths VT0 and VT1, with receive buffer registers RR0 and RR1 connected to the registers FR0 and FR1 on the paths VR0 and VR1, and with a circuit SP for supervizing the duration of seizure of the S-BUS.

The circuit SP includes counters to measure the duration of direct memory access, as controlled by the presence of the signal PRT, and also for counting the number of characters transmitted which is limited to a maximum of 16 before the bus is released. In the event of overflow, the circuit SP sends an interrupt request signal to the circuit PIC3.

For sending and for reception, the registers FR0, FR1, FT0 and FT1 in the four paths each include a control circuit CC comprising a counter which provides the following data which is required for controlling data transfers: register empty; sixteen characters in the register; and register full.

The transfer of data to the processor in direct memory access mode, i.e. writing directly into the processor memory, is initialized by the circuit DMM which applies a data request signal on the output D-REQ output of the 8257 package. For example, on the path VR0, transfer from the register FR0 to the circuit DMM begins when the control circuit CC indicates that the register is full. The circuit DMM then performs the transfer until it receives a "register empty" signal or an "end of message" signal which is supplied from the circuit HDL0 on detection of a character which flags the end of transmission. Data transfer from the processor in direct access mode is performed by initializing the circuit DMM and transferring data until the register FT0 is full or until an end of transfer signal is provided by the circuit DMM.

The circuit PIC3 handles three kinds of interrupt for each of the links RIT1 and RIT2, namely:
End of packet transfer interrupt (IT0, IT3);
End of message reception interrupt (IT1, IT4); and
End of message sending interrupt (IT2, IT5);
and also a S-BUS usage timeout interrupt from the circuit SP (interrupt signal IT6).

The send/receive circuits HDL0 and HDL1 are of the same type as the circuit HDLC1, and they are connected to their respective links of network RIT via respective interfaces INF0 and INF1 which provide electrical conversion of and also serve to relay send request signals AE and send authorization signals DE. The instructions for driving the circuits HDL0 and HDL1 are provided by a control circuit CHD which is connected to the circuits CCR, RG4, CA, HDL0, HDL1, and INP. The control circuit CHD includes a multiplexer corresponding to each of the circuits HDLn for switching instructions thereto from its internal registers, in a manner analogous to the multiplexer MX11 (see FIG. 3). The control circuit CHD may be realized in the form of hard-wired logic or else in the form of a PROM type memory circuit with functions comparable to those of the circuit AU (see FIG. 3).

The control circuit CHD is also connected to two address recognition circuits CA0 and CA1 for recognizing the addresses of units or markers. These circuits are loaded via the bus BDC on an instruction from the microprocessor mPU and they receive the address contained in the message on the receive channel at the output from the buffer register RRH. Data interchanges between the circuits HDLn and the registers FTn is as follows when sending over the network RIT.

After seizing a link such as RIT1, and after the processor has set the circuits DMM and HDL0 into send mode, a character is transferred from the register FT0 and the circuit HDL0 via the buffer register RT0 at an instant when the circuit CC of the register FT0 indicates that a character is available at the output of the register FT0 or that the circuit HDL0 is ready to send as is indicated by a flag signal on its output TDSR (see FIG. 3).

The characters are transmitted under the control of the circuit CHD until the end of the message as indicated by the "end of message" signal provided by the circuit DMM, and the "register empty" signal provided by the relevant circuit CC.

When receiving from the link RIT1, after the circuits HDL0 and DMM have been readied, the first character is transferred as soon as the circuit HDL0 is ready to receive as is indicated by a flag signal on its RDSR output (see FIG. 3). and the buffer register RRH is available, supposing that the receive path VR0 was not already active.

The first character is compared with the address loaded by the processor in the recognition circuit CA, to recognize the destination unit or marker before transferring the following characters.

If the comparison fails, a second comparison is made with an invariant character, which is the same for all units and markers (e.g. hexadecimal FF). This procedure enables the processor to broadcast a message to all the units and markers connected to the network RIT.

Further, the presence of two comparator circuits CA0 and CA1 makes it possible to use a different unit or marker address for each of the links RIT.

The end of message procedure begins as soon as the circuit HDLn detects the end of signal flag.

As indicated above, the circuits of the coupler are driven by the processor on the basis of the following information:
Addresses 0 to 63 provided by address lines LA0 to LA5;
Read/write signals via the wires CT; and
Data on wires LD0 to LD7.

The main instructions used are indicated by way of example for the circuit PIC3. The example is of normal use of the instructions CT connected to the R/W inputs of the circuit 8259A for reading or writing in the internal registers of that circuit.

For the base registers RB1 and RB2, data D0 to D3 is loaded by means of a write instruction.

For the unit or marker addresses in the comparator circuits CA0 and CA1, data is loaded on the data lines D0 to D7 via a write instruction.

For the direct access memory circuit DMM, reading and writing of a memory address for said direct access is provided by two consecutive bytes which are read or written over the data wires D0 to D7.

The index for counting the bytes transmitted is 16 bits long and is therefore read or written as two consecutive bytes.

These instructions are performed separately for each of the four paths connected to the circuit DMM.

The processor also controls the registers which are common to the four paths for reading the register state, and for writing in the control register, the mask register, etc.

Separate reading and writing is provided for the state registers and the control registers of the two circuits HDL0 and HDL1.

We claim:

1. A multiprocessor control system for distributed control of a set of processors in an exchange, each processor being provided with a respective link coupler corresponding to said processor and coupling the respective processor to a semaphore type serial link including a send link, a receive link, a send request link, a send acknowledge link and at least one clock line, said system including a data interchange network constituting said semaphore-type serial link and a distributor coupled to said semaphore-type serial link, said distributor having (i) selecting means (e.g. SMX2) for connecting one by one the send link coupled to each respective link coupler to a common distribution link, (ii) decoupling means (DG) connected to said common distribution link for relaying all received data from any send link to all receive links, whereby the selected one of the processors is enabled to broadcast data to all processors in said set, and (iii) distribution means for managing access from any processor to said common distribution link as a function of request-to-send signals sent by said any processor on its corresponding send request link, by sending send acknowledge signals on a corresponding send acknowledge link.

2. A multiprocessor control system with a set of processors for distributed control of an exchange, in which each processor is provided with a respective link coupler (ARIT) coupling it to a semaphore type serial link (RIT) having send link, a receive link, a send request link and a send acknowledge link, wherein said system comprises:
    multiplexing means (SMX) for connecting the send link coupled to each said respective link coupler to a common distribution link,
    decoupling means (DG) connected to said distribution link for relaying all received data from a processor simultaneously to each receive link towards the processor link couplers, and
    distribution means for managing said multiplexing means, said send request links and said send acknowledge links.

3. A multiprocessor control system for distributed control of a set of processors in an exchange, each processor being provided with a respective link coupler corresponding to said processor and coupling the respective processor to a semaphore type serial link including, for each processor, a send link, a receive link, a send request link, a send acknowledge link and at least one clock line, said system including a data interchange network constituting said semaphore-type serial link and a distributor coupled to said semaphore-type serial link, said distributor having (i) selecting means (e.g., SMX2) for connecting one by one the send link of each processor to a common distribution link, (ii) decoupling means (DG) connected to said common distribution link for relaying all received data from any send link to all receive links, whereby the selected one of the processors is enabled to broadcast data to all processors in said set, and (iii) distribution means for managing access from any processor to said common distribution link as a function of request to send signals sent by said any processor on its corresponding send request link, by sending send acknowledge signals on a corresponding send acknowledge link, said selecting means comprising: selector circuits for selecting, as respective outputs, one each of said send request links, said send acknowledge links and said send links; a synchronization circuit coupled to said clock line and providing a synchronization output; a scanner circuit responsive to said synchronization output for driving said selector circuits; a circuit responsive to a send request signal received on a selected send request link for enabling send requests; a bistable responsive to data received from a selected send link for regenerating said data and for applying said regenerated data to said common distribution link; and means for monitoring the duration of each occasion on which the distributor is seized by one of the processors in said set.

4. A multiprocessor control system for distributed control of a set of processors in an exchange, each processor including a memory and being provided with a respective link coupler corresponding to said processor and coupling the respective processor to a semaphore type serial link including, for each processor, a send link, a receive link, a send request link, a send acknowledge link and at least one clock line, said system including a data interchange network constituting said semaphore-type serial link and a distributor coupled to said semaphore-type serial link, said distributor having (i) selecting means (e.g., SMX2) for connecting one by one the send link of each processor to a common distribution link, (ii) decoupling means (DG) connected to said common distribution link for relaying all received data from any send link to all receive links, whereby the selected one of the processors is enabled to broadcast data to all processors in said set, and (iii) distribution means for managing access from any processor to said common distribution link as a function of request to send signals sent by said any processor on its corresponding send request link, by sending send acknowledge signals on a corresponding send acknowledge link, wherein each link coupled connected to said network comprises: an interface connected to a bus of the corresponding processor, said interface including two-way registers and a control circuit linked to said corresponding processor for decoding address data from said processor, together with a driver circuit comprising a processor bus controller circuit and a direct memory access circuit for direct memory access to the processor memory; at least one send/receive circuit connected to said network and controlled by the processor corresponding to the coupler; buffer registers for use both in sending and in receiving; and a coupler control circuit for controlling data sending and receiving between said two-way registers and said network.

5. A control system according to claim 3, wherein said distributor comprises a plurality of distributor modules, each distributor module being connected to a respective group of the processors in said set, the plurality of modules acting as a single distributor by intermodule connections for causing the scanner circuits to scan in sequence, and for multiplexing the outputs from the selector circuits for selecting a particular one of the send links sending data to the controller.

6. A control system according to claim 4, wherein each coupler comprises two independent internal buses for providing simultaneous data interchange with its corresponding processor's bus and with the data interchange network, a first one of said buses connecting the direct memory access circuit, the interface with the processor bus and the buffer registers, the second one of said internal buses connecting the send/receive circuit, memory block address registers, and a two-way register providing access to data lines of said processor bus; said buffer registers, together with FIFO buffer storage registers and associated counters serving to manage data interchanges in blocks of characters.

7. A control system according to claim 6, further comprising:
- two send/receive circuits connected to respective links of a duplicated data interchange network;
- two groups of send buffer registers;
- two groups of receive buffer registers; and
- a driver circuit capable of handling a plurality of independent paths, said driver circuit handling two independent send paths and two independent receive paths.

* * * * *